US012770437B2

(12) United States Patent
Martineau et al.

(10) Patent No.: US 12,770,437 B2
(45) Date of Patent: Oct. 20, 2026

(54) METHODS AND DEVICES FOR PREDICTIVE MAINTENANCE OF ROAD VEHICLE COMPONENTS

(71) Applicant: VITESCO TECHNOLOGIES GMBH, Hanover (DE)

(72) Inventors: Dominique Martineau, Toulouse (FR); Jean-Pierre Arocena, Toulouse (FR); Olivier Manns, Toulouse (FR); Nicolas Terral, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 1127 days.

(21) Appl. No.: 17/427,152

(22) PCT Filed: Jan. 30, 2020

(86) PCT No.: PCT/EP2020/052237
§ 371 (c)(1),
(2) Date: Jul. 30, 2021

(87) PCT Pub. No.: WO2020/157172
PCT Pub. Date: Aug. 6, 2020

(65) Prior Publication Data

US 2022/0092885 A1 Mar. 24, 2022

(30) Foreign Application Priority Data

Jan. 30, 2019 (FR) ........................................ 1900865

(51) Int. Cl.
*G07C 5/00* (2006.01)
*B60W 50/00* (2006.01)
(Continued)

(52) U.S. Cl.
CPC ......... *G07C 5/006* (2013.01); *B60W 50/0205* (2013.01); *B60W 50/045* (2013.01); *G07C 5/0808* (2013.01); *B60W 2050/0062* (2013.01)

(58) Field of Classification Search
CPC . G07C 5/006; G07C 5/0808; B60W 50/0205; B60W 50/045; B60W 2050/00
See application file for complete search history.

(56) References Cited

U.S. PATENT DOCUMENTS 6,609,051 B2 8/2003 Fiechter et al.
8,433,672 B2 4/2013 Shin et al.
(Continued)

FOREIGN PATENT DOCUMENTS

CN 102442316 A 5/2012
CN 109284521 A 1/2019
(Continued)

OTHER PUBLICATIONS

International Search Report for PCT/EP2020/052237 dated Apr. 22, 2020, 5 pages.
(Continued)

*Primary Examiner* — Jelani A Smith
*Assistant Examiner* — Gabriel Anfinrud
(74) *Attorney, Agent, or Firm* — NIXON & VANDERHYE

(57) ABSTRACT

Disclosed are methods and devices for predictive maintenance of at least one component of a road vehicle. The general principle is based on the combination of the ranges of values of parameters that represent the wear of a road vehicle component. The method includes observing the duration of use of combinations of ranges of values in order to deduce therefrom a wear profile which is compared with a predetermined wear profile. This mechanism makes it possible to reduce the amount of information to be stored.

19 Claims, 3 Drawing Sheets

(51) Int. Cl.

| | |
|---|---|
| ***B60W 50/02*** | (2012.01) |
| ***B60W 50/04*** | (2006.01) |
| ***G07C 5/08*** | (2006.01) |

(56) References Cited

U.S. PATENT DOCUMENTS

| | | | | |
|---|---|---|---|---|
| 8,560,165 | B2 | 10/2013 | Salman et al. | |
| 9,846,978 | B1 | 12/2017 | Tseng et al. | |
| 10,457,284 | B2 | 10/2019 | Augst | |
| 2003/0114965 | A1 | 6/2003 | Fiechter et al. | |
| 2008/0027681 | A1 * | 1/2008 | Nicastro | G05B 23/0283 702/184 |
| 2010/0042287 | A1 * | 2/2010 | Zhang | G07C 5/008 701/31.4 |
| 2011/0202494 | A1 | 8/2011 | Shin et al. | |
| 2013/0184929 | A1 | 7/2013 | Salman et al. | |
| 2016/0049022 | A1 * | 2/2016 | Offenhaeuser | G07C 5/0808 340/576 |
| 2017/0221069 | A1 * | 8/2017 | Remboski | G07C 5/0825 |
| 2017/0305424 | A1 | 10/2017 | Augst | |
| 2018/0126972 | A1 | 5/2018 | Bozsik et al. | |
| 2019/0025160 | A1 | 1/2019 | Marble et al. | |
| 2019/0080529 | A1 * | 3/2019 | Saylor | G07C 5/0816 |
| 2020/0051347 | A1 * | 2/2020 | Bohl | G07C 5/008 |
| 2021/0116426 | A1 * | 4/2021 | Tiemeyer | G05B 21/02 |

FOREIGN PATENT DOCUMENTS

| | | |
|---|---|---|
| DE | 102 35 525 | 4/2003 |
| EP | 0 661 673 | 7/1995 |

OTHER PUBLICATIONS

Written Opinion of the ISA for PCT/EP2020/052237 dated Apr. 22, 2020, 6 pages.

Office Action, issued in Chinese Patent Application No. 202080011569.1 dated Nov. 23, 2023.

* cited by examiner

METHODS AND DEVICES FOR PREDICTIVE MAINTENANCE OF ROAD VEHICLE COMPONENTS

CROSS-REFERENCE TO RELATED APPLICATIONS

This application is the U.S. national phase of International Application No. PCT/EP2020/052237 filed Jan. 30, 2020 which designated the U.S. and claims priority to French Application No. 1900865 filed Jan. 30, 2019, the entire contents of each of which are hereby incorporated by reference.

BACKGROUND OF THE INVENTION

Field of the Invention

The invention relates to the field of predictive maintenance. More precisely, it relates to methods and devices for predictive maintenance of at least one component of a road vehicle.

Preventive maintenance of a road vehicle enables the user of the road vehicle to anticipate maintenance that has already been scheduled in the life of the road vehicle.

Description of the Related Art

The document EP 0,661,673 A1 relates to a method of predictive maintenance in which a plurality of predetermined parameters representing the wear of the component to be taken into account is identified in an initialization step, the value of each wear parameter is read, the current value of the wear function is calculated using a predetermined wear function, and the value of the wear function obtained is compared with a threshold.

The document DE 102 35,525 A1 relates to methods of predictive maintenance in which the expected nominal value of a parameter of a component is predicted, and this value is compared with the value currently measured in the component, in order to determine abnormal behavior. This document also describes a method for evaluating the wear of a component as a function of various parameters, on the basis of frequency distributions. The wear evaluated in this way is used to update the predictive model used.

However, this predictive maintenance does not take into account the real state of the components of the road vehicle. This would make it possible to detect a potential fault in which a component is degraded as a result of continuous operation over a long time interval.

Furthermore, it does not allow real anticipation of maintenance, because it does not take into account the conditions of use of the component. This is because the duration of use of a component, usually expressed as a number of hours of operation, remains statistical in nature, and does not allow disparities of manufacture and/or use to be taken into account.

Consequently, the user is unable to draw the maximum benefit from the long life of the component, and therefore of the road vehicle, in a context of normal use.

Similarly, if a sudden failure occurs in the performance of the component, the user is only able to observe the failure of his component, without having been warned of the degradation of the component.

SUMMARY OF THE INVENTION

The present invention is therefore intended to overcome the aforesaid drawbacks.

For this purpose, a first aspect of the invention relates to a method for predictive maintenance of at least one component of a road vehicle.

A second aspect of the invention relates to a computer program with a program code for executing the steps of the method according to the first aspect of the invention.

And a third aspect of the invention relates to a device for predictive maintenance of at least one component of a road vehicle.

Thus the invention relates to a method for predictive maintenance of at least one component of a road vehicle, the component being connected to a computer. The method comprises the following steps:

identifying, by means of the computer, a plurality of predetermined parameters, each of which represents the wear of the component, each wear parameter possibly taking a value in a first predetermined range of values, dividing each first range of values, by means of the computer, into a plurality of predetermined intervals, combining, by means of the computer, some or all of the intervals of one first range of values with some or all of the intervals of the other first ranges of values, according to a first predetermined combination pattern, so as to obtain a plurality of intervals of combination of parameters, determining, by means of the computer, a duration of use of each interval of combination of parameters as a function of at least one distance traveled by the road vehicle, so as to obtain a wear profile, and comparing the wear profile, by means of the computer, with a predetermined wear profile.

In a first implementation, the computer is connected to an electronic controller of the component. In this case, the method further comprises the following steps:

identifying, by means of the computer, a plurality of error signals arranged for supplying the electronic controller, each of which represents a difference between an output value of the component and a target output value of the component, each error signal possibly taking a value in a second predetermined range of values, dividing, by means of the computer, each second range of values into a plurality of predetermined intervals, combining, by means of the computer, some or all of the intervals of one second range of values with some or all of the intervals of the other second ranges of values, according to a second predetermined combination pattern, so as to obtain a plurality of intervals of combination of error signals, determining, by means of the computer, a duration of use of each interval of combination of error signals as a function of at least one distance traveled by the road vehicle, so as to obtain an adaptation profile, and comparing the adaptation profile, by means of the computer, with a predetermined adaptation profile.

In a second implementation, the computer is connected to a plurality of sensors of the road vehicle, which represent its dynamic behavior and/or its traffic environment. In this case, the method further comprises the following steps:

identifying, by means of the computer, at least one output value of each sensor, each output value possibly taking a value in a third predetermined range of values, dividing, by means of the computer, each third range of values into a plurality of predetermined intervals, combining, by means of the computer, some or all of the intervals of one third range of values with some or all of the intervals of the other third ranges of values, according to a third predetermined combination pattern, so as to obtain a plurality of intervals of combination of sensor values, determining, by means of the computer, a duration of use of each interval of combination of sensor values as a function of at least one distance traveled by the road vehicle, so as to obtain a driving profile, and comparing the driving profile, by means of the computer, with a predetermined driving profile.

In a third implementation, the method further comprises a step in which the computer is arranged for calculating at least one statistical quantity on the basis of the wear, adaptation and/or driving profiles.

The invention also relates to a computer program with a program code for executing the steps of a method according to the invention when the computer program is loaded into the computer or executed in the computer.

The invention also covers a device for predictive maintenance of at least one component of a road vehicle. The device comprises a computer arranged to be connected to the component, wherein the computer is configured for:

identifying a plurality of predetermined parameters, each of which represents the wear of the component, each wear parameter possibly taking a value in a first predetermined range of values, dividing each first range of values into a plurality of predetermined intervals, combining some or all of the intervals of one first range of values with some or all of the intervals of the other first ranges of values, according to a first predetermined combination pattern, so as to obtain a plurality of intervals of combination of parameters, determining a duration of use of each interval of combination of parameters as a function of at least one distance traveled by the road vehicle, so as to obtain a wear profile, and comparing the wear profile with a predetermined wear profile.

In a first implementation, the computer is arranged to be connected to an electronic controller of the component. In this case, the computer is also configured for:

identifying a plurality of error signals arranged for supplying the electronic controller, each of which represents a difference between an output value of the component and a target output value of the component, each error signal possibly taking a value in a second predetermined range of values, dividing each second range of values into a plurality of predetermined intervals, combining some or all of the intervals of one second range of values with some or all of the intervals of the other second ranges of values, according to a second predetermined combination pattern, so as to obtain a plurality of intervals of combination of error signals, determining a duration of use of each interval of combination of error signals as a function of at least one distance traveled by the road vehicle, so as to obtain an adaptation profile, and comparing the adaptation profile with a predetermined adaptation profile.

In a second implementation, the computer is arranged to be connected to a plurality of sensors of the road vehicle, which represent its dynamic behavior and/or its traffic environment. In this case, the computer is also configured for:

identifying at least one output value of each sensor, each output value possibly taking a value in a third predetermined range of values, dividing each third range of values into a plurality of predetermined intervals, combining some or all of the intervals of one third range of values with some or all of the intervals of the other third ranges of values, according to a third predetermined combination pattern, so as to obtain a plurality of intervals of combination of sensor values, determining a duration of use of each interval of combination of sensor values as a function of at least one distance traveled by the road vehicle, so as to obtain a driving profile, and comparing the driving profile with a predetermined driving profile.

In a third implementation, the computer is arranged for calculating at least one statistical quantity on the basis of the wear, adaptation and/or driving profiles.

In a fourth implementation, the device comprises predictive maintenance display unit connected to the computer.

BRIEF DESCRIPTION OF THE DRAWINGS

Other characteristics and advantages of the invention will be more readily understood by a perusal of the following description with reference to the attached drawings, provided for illustration and in a non-limiting way.

DESCRIPTION OF THE PREFERRED EMBODIMENTS

For the sake of clarity, the elements represented are not necessarily shown to scale with respect to each other, unless specified otherwise.

The general principle of the invention is based on the combination of the ranges of values of parameters that represent the wear of a road vehicle component. The invention proposes observing the duration of use of the combinations of ranges of values in order to deduce therefrom a wear profile which is compared with a predetermined wear profile. This mechanism makes it possible to reduce the amount of information to be stored.

Figure 1:
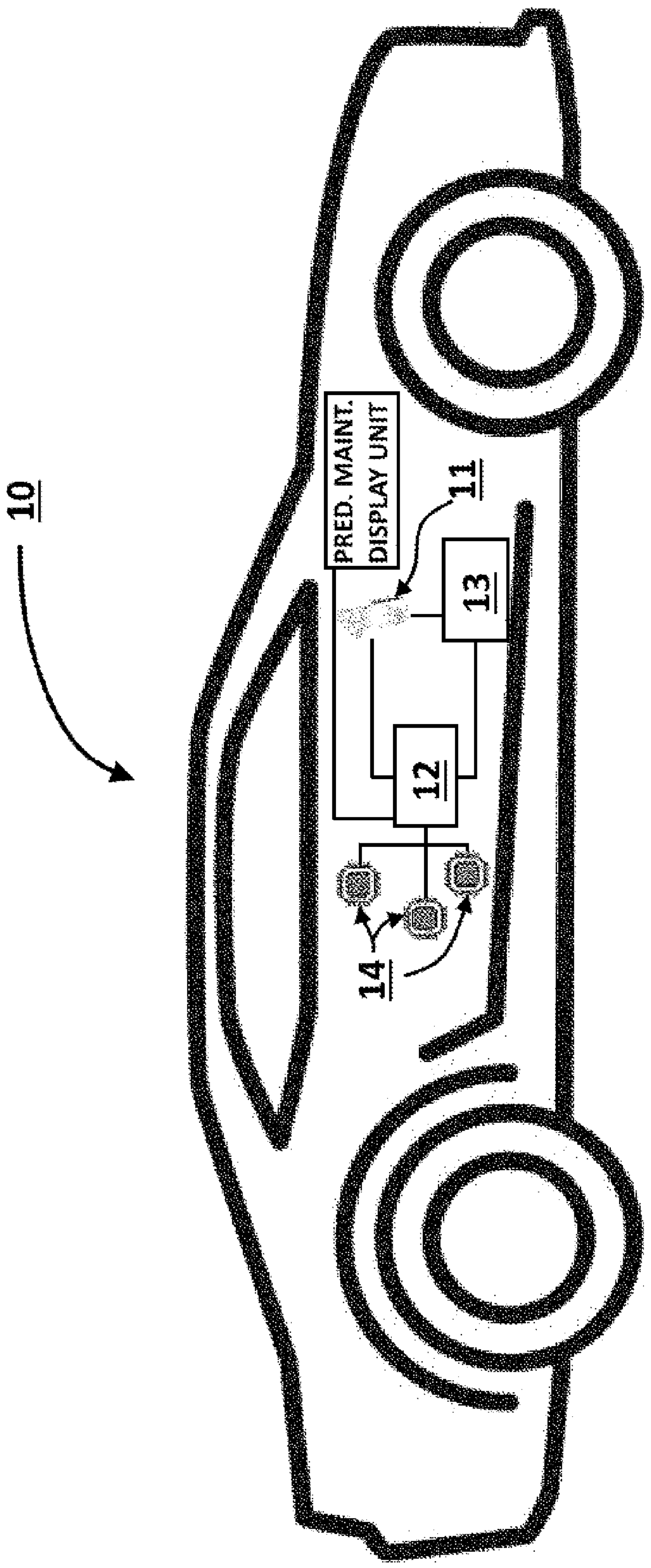
FIG. 1 shows a road vehicle comprising a device according to the invention.

FIG. 1 shows a road vehicle 10 comprising a device according to the invention. "Road vehicle" is taken to mean any vehicle that has an engine (usually of the internal combustion or electrical type) intended to move it along the road, and that is capable of carrying persons or loads (a car or a motorcycle, for example).

In the example of FIG. 1, the road vehicle 10 comprises at least one component 11, at least one computer 12, at least one electronic controller 13 of the component 11 and a plurality of sensors 14. In a particular implementation, the electronic controller 13 is included in the computer 12.

The computer 12 is also connected to the component 11, to the electronic controller 13 and to the plurality of sensors 14, for example, via a data communication bus of the CAN (Controller Area Network) or FlexRay type.

In a particular implementation, the road vehicle 10 further comprises a predictive maintenance display unit connected to the computer 12.

In the invention, the aforementioned elements of the road vehicle 10 are of types known to those skilled in the art.

Thus, the component 11 corresponds to all the components of a road vehicle 10 whose wear can be measured by electronic means. In the example of FIG. 1, the component 11 is a fuel injector for a motor vehicle. However, the component 11 could be of any other type, such as a pump, a turbo-compressor, a piezoresistive gauge pressure sensor, a sensor of longitudinal deceleration of the vehicle, a sensor of wheel rotation speed, a sensor of vertical travel of wheels, an electric motor, a power electronics circuit, a master cylinder pressure actuator, or a computer.

The computer 12 also corresponds to a processor. In the example of FIG. 1, the computer 12 is an electronic control unit.

Additionally, the electronic controller 13 is a processor. In the example of FIG. 1, the electronic controller 13 controls the injection of fuel by the injector 11 according to a predetermined control law. In other words, the electronic controller 13 implements a known method of auto-adaptation of the control of the injector 11 to detect, at the time of an injection, an error signal representing a difference between the amount of fuel to be injected and the amount actually injected, by measuring various parameters of the injector such as the voltage supplied to the injector, the injection time, etc. Such a difference is then compensated in the subsequent injection commands.

Additionally, the sensors 14 are arranged to acquire physical characteristics describing the dynamic behavior of the road vehicle 10 and/or of its traffic environment.

In the example of FIG. 1, the sensors 14 may be chosen from among the following sensors: speed sensor, engine torque sensor, engine temperature sensor, pedal position sensor, acceleration/deceleration sensor, steering wheel angle/steering sensor, rain sensor, brightness sensor, and temperature sensor. However, any other sensor connected to the computer 12 may be envisaged.

Similarly, the predictive maintenance display unit may be a liquid crystal screen, such as a computer or tablet screen, possibly associated with an audible alarm. In the invention, the predictive maintenance display unit may give a warning to a user of the road vehicle 10 on the basis of information supplied by the computer 12.

Figure 2:
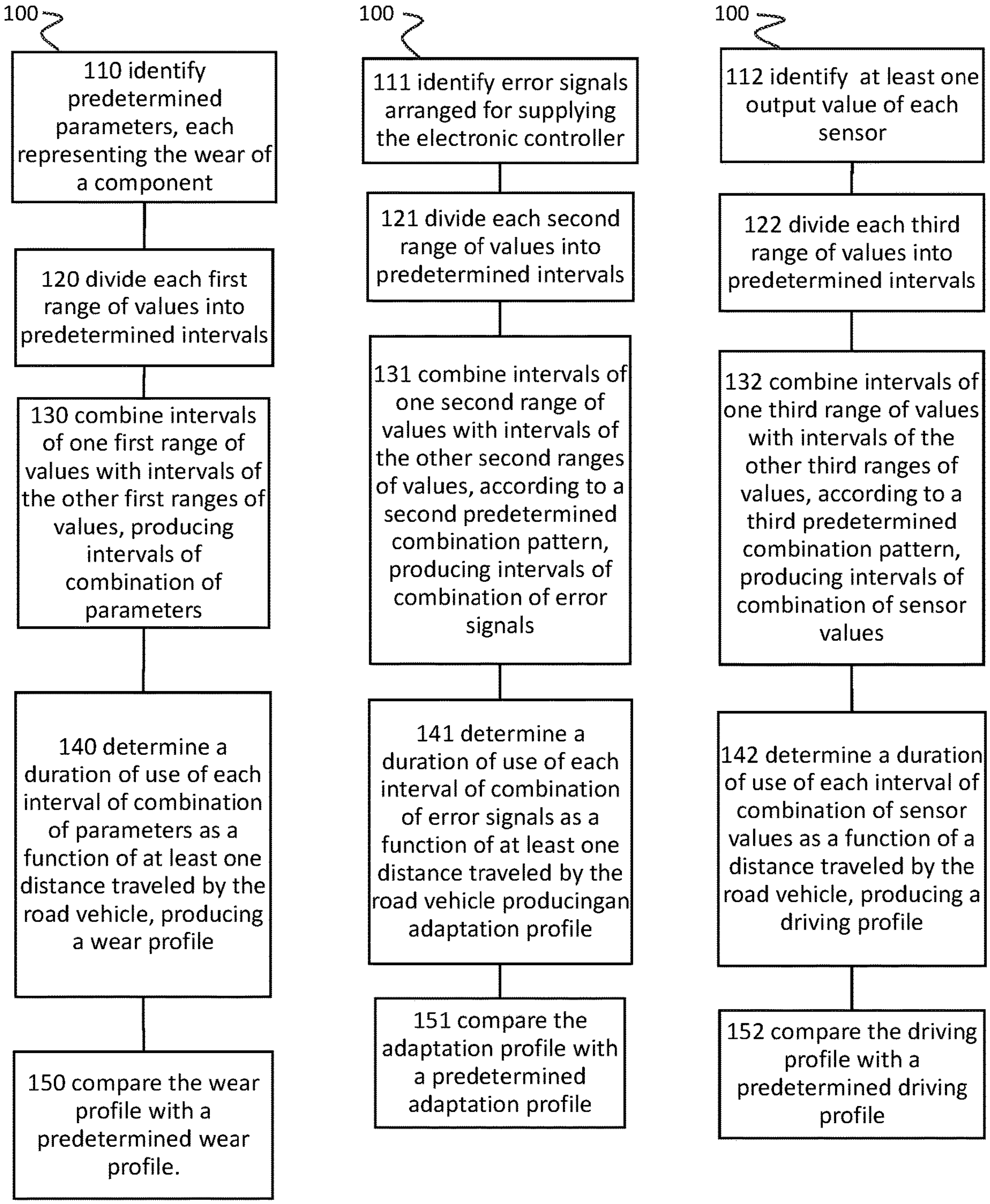
FIG. 2 shows a method according to the invention.

FIG. 2 shows a method 100 according to the invention relating to the predictive maintenance of the component 11.

In the example of FIG. 2, the method 100 initially consists, in step 110, in identifying, by means of the computer 12, a plurality of predetermined parameters, each of which represents the wear of the component 11.

In the example of FIG. 1, in which the component 11 is a fuel injector, le computer 12 may identify parameters such as the fuel injection pressure (or "fuel pressure"), the temperature of the fuel (or "fuel temperature"), the quantity of fuel injected (or "fuel delivery") and the speed of the injection pump (or "pump speed"). However, other parameters may be envisaged.

In the invention, each wear parameter may take a value in a first predetermined range of values. In the invention, the first predetermined range of values is delimited by a first extreme value and a second extreme value.

For example, in FIG. 1, the first predetermined range of values of the fuel injection pressure may be [0 bar; 250 bar], while that of the fuel temperature may be [−30° C.; 80° C.].

Step 120 then consists in dividing, by means of the computer 12, each first range of values into a plurality of predetermined intervals.

For example, in FIG. 1, the first predetermined range of values of the fuel injection pressure may be divided into intervals of 20 bar, while that of the fuel temperature may be divided into intervals of 5° C.

Figure 3:
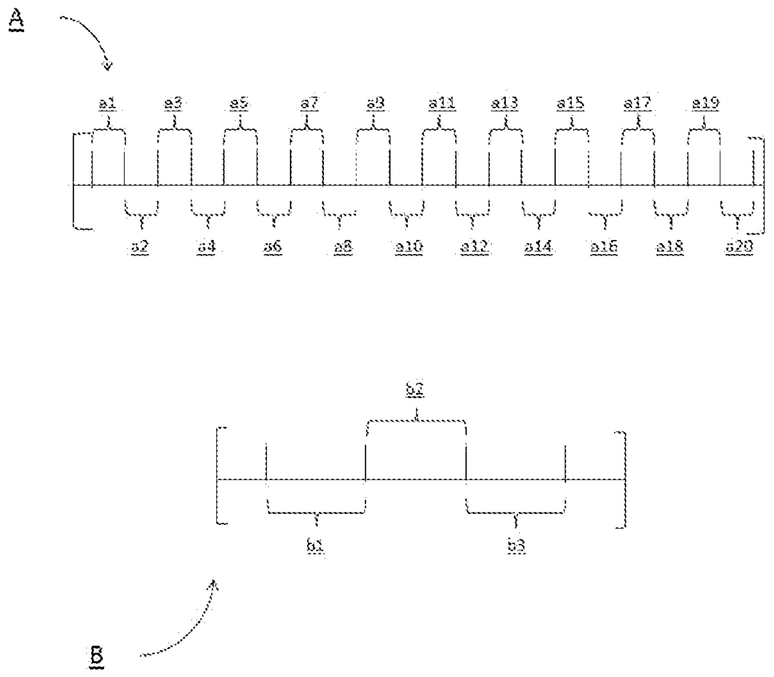
FIG. 3 shows the principle of division of ranges of values according to the invention.

FIG. 3 shows the principle of division of ranges of values according to the invention.

The example of FIG. 3 shows two ranges of values A and B, which are divided into a plurality of predetermined intervals. The range of values A is divided into twenty intervals of values a1, a2, . . . , a20, and the range of values B is divided into three intervals of values b1, b2 and b3.

Thus, in the invention, the division of each range of values is specific to it and is not necessarily performed in the same way for the other ranges of values.

Returning to FIG. 2, step 130 consists in combining, by means of the computer 12, some or all of the intervals of one first range of values with some or all of the intervals of the other first ranges of values, so as to obtain a plurality of intervals of combination of parameters.

In the example of FIG. 1, the computer 12 can combine some or all of the intervals of the first predetermined range of values associated with the fuel injection pressure with some or all of the intervals of the predetermined first range of values associated with the fuel temperature.

In the example of FIG. 3, an interval of combination may comprise the following combinations: a1-b1, a1-b3, a5-b2, a6-b2, a9-b1 or a15-b3. However, other combinations may be envisaged.

In the invention, the combination of intervals of the first range of values is performed according to a first predetermined combination pattern. The predetermined combination pattern may be determined in the laboratory during the validation of the component 11. The predetermined combination pattern may also be supplemented with field measurements made on training vehicles. The data collected may subsequently be analyzed by statistical tools or machine learning, to identify the intervals of combination of parameters that are most representative.

Additionally, step 140 consists in determining, by means of the computer 12, a duration of use of each interval of combination of parameters as a function of at least one distance traveled by the road vehicle 10, so as to obtain a wear profile.

In practice, the computer 12 may comprise a time counter which is launched, during the use of the road vehicle 10, on each use of an interval of combination of parameters. The computer 12 may also comprise an odometer for determining the distance traveled by the road vehicle 10. Thus it is possible to establish a wear profile corresponding to the coupling between the duration of use of each interval of combination of parameters and a distance traveled by the road vehicle 10. In other words, the wear profile is a statistical distribution (also called a frequency distribution) of the intervals of combination of parameters. For example, the invention may produce a wear profile of the component 11 at 10,000 km, 20,000 km or 50,000 km.

Finally, step 150 consists in comparing the wear profile, by means of the computer 12, with a predetermined wear profile. This step makes it possible to detect a divergence from the predetermined wear profile. If such a divergence is detected, the computer 12 may give a warning to a user of the road vehicle 10 via the predictive maintenance display unit.

The predetermined wear profile may be determined in the laboratory during the validation of the component 11. The predetermined wear profile may also be supplemented with field measurements made on training vehicles. The data collected may subsequently be analyzed by statistical tools or machine learning, in order to identify the intervals of combination of parameters that are most representative according to the distance traveled.

A number of particular implementations of the method 100 may be envisaged.

In a first particular implementation of the method 100, the wear of the component 11 is detected by observing the variation of the error signals used by the electronic controller 13 for regulating the control of the component 11.

For example, in FIG. 1, the wear of the injector 11 may be detected, during the use of the road vehicle 10, when the amount of fuel actually injected differs from the amount of fuel to be injected.

In practice, the method 100 may consist, in step 111, in a similar manner to step 110, in identifying, by means of the computer 12, a plurality of error signals arranged for supplying the electronic controller 13, each of which represents a difference between an output value of the component and a target output value of the component. In the invention, each error signal may take a value in a second predetermined range of values.

Step 121 then consists, in a similar manner to step 120, in dividing, by means of the computer 12, each second range of values into a plurality of predetermined intervals.

Additionally, step 131, in a similar manner to step 130, consists in combining, by means of the computer, some or all of the intervals of one second range of values with some or all of the intervals of the other second ranges of values, according to a second predetermined combination pattern, so as to obtain a plurality of intervals of combination of error signals.

Additionally, step 141, in a similar manner to step 140, consists in determining, by means of the computer 12, a duration of use of each interval of combination of error signals as a function of at least one distance traveled by the road vehicle, so as to obtain an adaptation profile.

Finally, step 151, in a similar manner to step 150, consists in comparing the adaptation profile, by means of the computer 12, with a predetermined adaptation profile.

In a second particular implementation of the method 100, the wear of the component 11 is detected by observing the driving style of the driver of the road vehicle 10.

In practice, the method 100 may consist, in step 112, in a similar manner to step 110, in identifying, by means of the computer 12, at least one output value of each sensor. In the invention, each output value may take a value in a third predetermined range of values.

Step 122 then consists, in a similar manner to step 120, in dividing, by means of the computer 12, each third range of values into a plurality of predetermined intervals.

Additionally, step 132, in a similar manner to step 130, consists in combining, by means of the computer, some or all of the intervals of one third range of values with some or all of the intervals of the other third ranges of values, according to a third predetermined combination pattern, so as to obtain a plurality of intervals of combination of sensor values.

Additionally, step 142, in a similar manner to step 140, consists in determining, by means of the computer 12, a duration of use of each interval of combination of sensor values as a function of at least one distance traveled by the road vehicle, so as to obtain a driving profile.

Finally, step 152, in a similar manner to step 150, consists in comparing the driving profile, by means of the computer 12, with a predetermined driving profile.

In one implementation of the invention, the method 100 comprises a step in which the computer 12 is arranged for calculating at least one statistical quantity on the basis of the wear, adaptation and/or driving profiles.

In practice, this statistical quantity makes it possible to synthesize the information contained in the wear, adaptation and/or driving profiles in order to facilitate the comparison of these with the predetermined wear, adaptation and/or driving profiles.

For example, the computer 12 may calculate all the statistics required for characterizing a statistical series, such as the position characteristics (e.g. the mode, the median, the arithmetic mean, the quantiles) and the dispersion characteristics (e.g. the spread, the mean deviation, the inter-quantile deviation, the variance, the standard deviation and the coefficient of variation). However, other statistical quantities may be envisaged.

In a particular embodiment of the invention, the various steps of the method 100 are determined by instructions of computer programs. Therefore, the invention also proposes a program with a computer program code recorded in a non-volatile storage medium. In the invention, this program code is capable of executing the steps of the method 100 when the computer program is loaded into the computer or executed in the computer.

The present invention has been described above in the detailed description and illustrated in the figure. However, the present invention is not limited to the embodiments described. Thus other variants and embodiments may be deduced and implemented by those skilled in the art from a perusal of the present description and the attached figure.

The invention claimed is:

1. A method for predictive maintenance of a plurality of components of a road vehicle, each of the components being connected to a computer, the road vehicle comprising a predictive maintenance display unit connected to the computer, the method comprising:

- identifying, by operation of the computer, a plurality of predetermined wear parameters, each of which represents wear of a given one of the components, each of the wear parameters taking a value in a predetermined range of wear values corresponding to the component with which a given said wear parameter is associated,
- dividing each said predetermined range of wear values, by operation of the computer, into a plurality of predetermined wear value intervals,
- combining, by operation of the computer, at least some of the wear value intervals associated with a first of the components with at least some of the wear value intervals associated with a second of the components, according to a first predetermined combination pattern, so as to obtain a plurality of intervals of combination of wear parameters,
- determining, by operation of the computer, a duration of use of each said interval of combination of wear parameters as a function of at least one distance traveled by the road vehicle, so as to obtain a determined wear profile,
- comparing the determined wear profile, by operation of the computer, with a predetermined wear profile, and
- giving a warning, by operation of the computer, via the predictive maintenance display unit upon detecting that the determined wear profile diverges from the predetermined wear profile.

2. The method as claimed in claim 1, wherein the computer is connected to an electronic controller of the components, the method further comprising:

identifying, by operation of the computer, a plurality of error signals arranged for supplying the electronic controller, each of the error signals representing a difference between an output value of a given said component and a target output value of the given said component, each of the error signals taking a value in a predetermined range of error signal values corresponding to the component with which a given said error signal is associated, dividing each said predetermined range of error signal values, by operation of the computer, into a plurality of predetermined error signal intervals, combining, by operation of the computer, at least some of the error signal intervals associated with a first of the components with at least some of the error signal intervals associated with a second of the components, according to a second predetermined combination pattern, so as to obtain a plurality of intervals of combination of error signals, determining, by operation of the computer, a duration of use of each interval of combination of error signals as a function of at least one distance traveled by the road vehicle, so as to obtain ana determined adaptation profile, comparing the adaptation profile, by operation of the computer, with a predetermined adaptation profile, and giving a warning, by operation of the computer, via the predictive maintenance display unit upon detecting that the determined adaptation profile diverges from the predetermined adaptation profile.

3. The method as claimed in claim 2, wherein the computer is connected to a plurality of sensors of the road vehicle, which represent the road vehicle's dynamic behavior and/or the road vehicle's traffic environment, the method further comprising:

identifying, by operation of the computer, at least one output value of each of the sensors, each the output values taking a value in a of predetermined range of sensor values corresponding to a given one of the sensors, dividing each said range of sensor values, by operation of the computer, into a plurality of predetermined sensor value intervals, combining, by operation of the computer, at least some of the sensor value intervals of one third range of values associated with a first of the sensors with at least some of the sensor value intervals associated with a second of the sensors, according to a third predetermined combination pattern, so as to obtain a plurality of intervals of combination of sensor values, determining, by operation of the computer, a duration of use of each said interval of combination of sensor values as a function of at least one distance traveled by the road vehicle, so as to obtain a determined driving profile, and comparing the driving profile, by operation of the computer, with a predetermined driving profile, and giving a warning, by operation of the computer, via the predictive maintenance display unit upon detecting that the determined driving profile diverges from the predetermined driving profile.

4. The method as claimed in claim 2, further comprising:

a step in which the computer is arranged calculating, by operation of the computer, at least one statistical quantity based on at least one of the determined wear profile, the determined adaptation profile, and/or the determined driving profile.

5. A non-transitory computer-readable medium on which is stored a computer program with a program code that executes the steps of a method as claimed in claim 2 when the computer program is executed by the computer.

6. The method as claimed in claim 1, wherein the computer is connected to a plurality of sensors of the road vehicle, which represent the road vehicle's dynamic behavior and/or the road vehicle's traffic environment, the method further comprising:

identifying, by operation of the computer, at least one output value of each of the sensors, each of the output a values taking a value in predetermined range of sensor values corresponding to a given one of the sensors, dividing each said range of sensor values, by operation of the computer, into a plurality of predetermined sensor value intervals, combining, by operation of the computer, at least some of the sensor value intervals of one third range of values associated with a first of the sensors with at least some of the sensor value intervals associated with a second of the sensors, according to a third predetermined combination pattern, so as to obtain a plurality of intervals of combination of sensor values, determining, by operation of the computer, a duration of use of each said interval of combination of sensor values as a function of at least one distance traveled by the road vehicle, so as to obtain a determined driving profile, and comparing the driving profile, by operation of the computer, with a predetermined driving profile, and giving a warning, by operation of the computer, via the predictive maintenance display unit upon detecting that the determined driving profile diverges from the predetermined driving profile.

7. The method as claimed in claim 6, further comprising:

calculating, by operation of the computer, at least one statistical quantity based on at least one of the determined wear profile, the determined adaptation profile, and the determined driving profile.

8. A non-transitory computer-readable medium on which is stored a computer program with a program code that executes the steps of a method as claimed in claim 6 when the computer program is executed by the computer.

9. The method as claimed in claim 1, further comprising:

calculating, by operation of the computer, at least one statistical quantity based on at least one of the determined wear profile, the determined adaptation profile, and/or the determined driving profile.

10. A non-transitory computer-readable medium on which is stored a computer program with a program code that executes the steps of a method as claimed in claim 9 when the computer program is executed by the computer.

11. A non-transitory computer-readable medium on which is stored a computer program with a program code that executes the steps of a method as claimed in claim 1 when the computer program is executed by the computer.

12. A non-transitory computer-readable medium on which is stored a computer program with a program code that executes the steps of a method as claimed in claim 11 when the computer program is executed by the computer.

13. The method of claim 1, wherein, for each given one of the predetermined parameters, all of the predetermined intervals are of a same size.

14. A device for the predictive maintenance of a plurality of components of a road vehicle, the device comprising a computer arranged to be connected to each of the components and also connected to a predictive maintenance display unit, wherein the computer is configured for:

identifying a plurality of predetermined wear parameters, each of which represents wear of a given one of the components, each of the wear parameters taking a value in a predetermined range of wear values corresponding to the component with which a given said wear parameter is associated, dividing each said predetermined range of wear values into a plurality of predetermined wear value intervals, combining at least some of the wear value intervals associated with a first of the components with at least some of the wear value intervals associated with a second of the components, according to a first predetermined combination pattern, so as to obtain a plurality of intervals of combination of wear parameters, determining a duration of use of each said interval of combination of wear parameters as a function of at least one distance traveled by the road vehicle, so as to obtain a determined wear profile, comparing the determined wear profile with a predetermined wear profile, and giving a warning via the predictive maintenance display unit upon detecting that the determined wear profile diverges from the predetermined wear profile.

15. The device as claimed in claim 6, wherein the computer is arranged to be connected to an electronic controller of the component, the computer also being configured for:

identifying a plurality of error signals arranged for supplying the electronic controller, each of the error signals representing a difference between an output value of a given said component and a target output value of the given said component, each of the error signals taking a value in a predetermined range of error signal values corresponding to the component with which a given said error signal is associated, dividing each said predetermined range of error signal values into a plurality of predetermined error signal intervals, combining at least some of the error signal intervals associated with a first of the components with at least some of the error signal intervals associated with a second of the components, according to a second predetermined combination pattern, so as to obtain a plurality of intervals of combination of error signals, determining a duration of use of each interval of combination of error signals as a function of at least one distance traveled by the road vehicle, so as to obtain a determined adaptation profile, comparing the adaptation profile with a predetermined adaptation profile, and giving a warning, by operation of the computer, via the predictive maintenance display unit upon detecting that the determined adaptation profile diverges from the predetermined adaptation profile.

16. The device as claimed in claim 15, wherein the computer is arranged to be connected to a plurality of sensors of the road vehicle, which represent the road vehicle's dynamic behavior and/or the road vehicle's traffic environment, the computer also being configured for:

identifying at least one output value of each of the sensors, each of the output values taking a value in a predetermined range of sensor values corresponding to a given one of the sensors, dividing each said range of sensor values into a plurality of predetermined sensor value intervals, combining at least some of the sensor value intervals associated with a first of the sensors with at least some of the sensor value intervals associated with a second of the sensors, according to a third predetermined combination pattern, so as to obtain a plurality of intervals of combination of sensor values, determining a duration of use of each said interval of combination of sensor values as a function of at least one distance traveled by the road vehicle, so as to obtain a determined driving profile, comparing the driving profile with a predetermined driving profile, and giving a warning, by operation of the computer, via the predictive maintenance display unit upon detecting that the determined driving profile diverges from the predetermined driving profile.

17. The device as claimed in claim 14, wherein the computer is arranged to be connected to a plurality of sensors of the road vehicle, which represent the road vehicle's dynamic behavior and/or the road vehicle's traffic environment, the computer also being configured for:

identifying at least one output value of each of the sensors, each of the output values taking a value in a predetermined range of sensor values corresponding to a given one of the sensors, dividing each said range of sensor values into a plurality of predetermined sensor value intervals, combining at least some of the sensor value intervals associated with a first of the sensors with at least some of the sensor value intervals associated with a second of the sensors, according to a third predetermined combination pattern, so as to obtain a plurality of intervals of combination of sensor values, determining a duration of use of each said interval of combination of sensor values as a function of at least one distance traveled by the road vehicle, so as to obtain a determined driving profile, comparing the driving profile with a predetermined driving profile, and giving a warning, by operation of the computer, via the predictive maintenance display unit upon detecting that the determined driving profile diverges from the predetermined driving profile.

18. The device as claimed in claim 14, wherein the computer is arranged for calculating at least one statistical quantity based on at least one of the determined wear profile, the determined adaptation profile, and/or the determined driving profile.

19. The device of claim 14, wherein, for each given one of the predetermined parameters, all of the predetermined intervals are of a same size.

* * * * *